(12) United States Patent
Muelhaupt et al.

(10) Patent No.: US 8,946,377 B2
(45) Date of Patent: Feb. 3, 2015

(54) HIGHLY FUNCTIONAL POLYETHEROLS AND THE PRODUCTION AND USE THEREOF

(75) Inventors: Rolf Muelhaupt, Freiburg (DE); Anne Fiedler, Munich (DE); Fabian Schueler, Lenzkirch (DE); Bernd Bruchmann, Freinsheim (DE); Markus Schuette, Osnabrueck (DE); Daniel Schoenfelder, Brussels (BE)

(73) Assignee: BASF SE, Ludwigshafen (DE)

( * ) Notice: Subject to any disclaimer, the term of this patent is extended or adjusted under 35 U.S.C. 154(b) by 377 days.

(21) Appl. No.: 12/866,464

(22) PCT Filed: Feb. 12, 2009

(86) PCT No.: PCT/EP2009/051648
§ 371 (c)(1),
(2), (4) Date: Aug. 6, 2010

(87) PCT Pub. No.: WO2009/101141
PCT Pub. Date: Aug. 20, 2009

(65) Prior Publication Data
US 2010/0324261 A1 Dec. 23, 2010

(30) Foreign Application Priority Data

Feb. 15, 2008 (EP) .................................... 08151527
Sep. 5, 2008 (EP) .................................... 08163767

(51) Int. Cl.
| | |
|---|---|
| *C08G 63/668* | (2006.01) |
| *C08G 63/688* | (2006.01) |
| *C08G 63/695* | (2006.01) |
| *C08G 63/82* | (2006.01) |
| *C08G 65/28* | (2006.01) |
| *C08G 65/34* | (2006.01) |
| *C08G 65/26* | (2006.01) |
| *C08G 65/30* | (2006.01) |
| *C08G 65/46* | (2006.01) |
| *C08G 65/48* | (2006.01) |

(52) U.S. Cl.
CPC ............ *C08G 65/2609* (2013.01); *C08G 65/30* (2013.01); *C08G 65/34* (2013.01); *C08G 65/46* (2013.01); *C08G 65/48* (2013.01); *Y10S 424/16* (2013.01)
USPC ................... 528/271; 424/DIG. 16; 528/272; 528/274; 528/296; 528/297; 528/300; 528/373; 528/374; 528/403; 528/405; 528/408; 528/417; 528/425; 528/486; 528/487; 528/491; 528/492; 528/495; 528/496

(58) Field of Classification Search
CPC ........ C08G 65/00; C08G 65/02; C08G 65/26; C08G 65/2603; C08G 65/2606; C08G 65/2609; C08G 65/2642; C08G 65/2666; C08G 65/2675; C08G 65/34; C08G 65/48

USPC ........... 424/DIG. 16; 528/271, 272, 274, 296, 528/297, 300, 373, 374, 403, 405, 408, 417, 528/425, 486, 487, 491, 492, 495, 496
See application file for complete search history.

(56) References Cited

U.S. PATENT DOCUMENTS

| | | | | |
|---|---|---|---|---|
| 2,178,173 | A | * | 10/1939 | Katzman et al. ................. 554/80 |
| 2,407,895 | A | * | 9/1946 | Monson et al. ................ 516/180 |
| 2,462,047 | A | | 2/1949 | Wyler |
| 3,673,226 | A | | 6/1972 | Malec |
| 3,932,532 | A | | 1/1976 | Hunter et al. |
| 4,568,737 | A | * | 2/1986 | Tomalia et al. ................ 528/332 |
| 4,581,470 | A | | 4/1986 | Hoy et al. |
| 5,393,463 | A | * | 2/1995 | Fikentscher et al. .......... 516/180 |
| 5,418,301 | A | * | 5/1995 | Hult et al. ...................... 525/437 |
| 5,728,796 | A | | 3/1998 | Liao et al. |
| 6,617,418 | B1 | * | 9/2003 | Magnusson et al. ........... 528/417 |
| 2004/0171755 | A1 | * | 9/2004 | Yokoyama et al. ............ 525/176 |
| 2008/0153931 | A1 | * | 6/2008 | Bruchmann et al. .......... 516/185 |
| 2011/0009566 | A1 | * | 1/2011 | Jain et al. ....................... 525/178 |

FOREIGN PATENT DOCUMENTS

| | | |
|---|---|---|
| DE | 44 46 877 | 7/1996 |
| DE | 199 47 631 | 6/2000 |
| DE | 102 11 664 | 10/2003 |
| DE | 103 07 172 | 5/2005 |
| EP | 0 141 253 | 5/1985 |
| WO | 96 20234 | 7/1996 |
| WO | 00 56802 | 9/2000 |
| WO | 02 26697 | 4/2002 |
| WO | 02 36695 | 5/2002 |
| WO | 03 062306 | 7/2003 |
| WO | 2004 074346 | 9/2004 |
| WO | 2009 021986 | 2/2009 |

OTHER PUBLICATIONS

International Search Report issued Jun. 10, 2009 in PCT/EP09/051648 filed Feb. 12, 2009.

* cited by examiner

*Primary Examiner* — Ana Woodward
(74) *Attorney, Agent, or Firm* — Oblon, Spivak, McClelland, Maier & Neustadt, L.L.P.

(57) ABSTRACT

The present invention relates to a process for preparing high-functionality polyetherols by reacting at least one trifunctional or higher-functionality alcohol and if appropriate further di- and/or monofunctional alcohols and/or modifying reagents, with the aid of acidic catalysts, where the trifunctional or higher-functionality alcohol is not glycerol. The present invention further relates to high-functionality polyetherols obtainable by such a process and to the use of these high-functionality polyetherols as adhesion promoters, thixotropic agents, rheology modifiers of polymers, phase transfer reagents, micro- or nanocontainers for biologically active compounds, for example for active medical ingredients, biocides, herbicides or fungicides, as pigment dispersants, an additive in printing inks or as structural units for preparing polyaddition or polycondensation polymers or for treatment of seed.

15 Claims, No Drawings

HIGHLY FUNCTIONAL POLYETHEROLS AND THE PRODUCTION AND USE THEREOF

The present invention relates to a process for preparing high-functionality polyetherols by reacting at least one trifunctional or higher-functionality alcohol and if appropriate further di- and/or monofunctional alcohols and/or modifying reagents, with the aid of acidic catalysts, where the trifunctional or higher-functionality alcohol is not glycerol. The present invention further relates to high-functionality polyetherols obtainable by such a process and to the use of these high-functionality polyetherols as adhesion promoters, thixotropic agents, rheology modifiers of polymers, phase transfer reagents, micro- or nanocontainers for biologically active compounds, for example for active medical ingredients, biocides, herbicides or fungicides, as pigment dispersants, an additive in printing inks or as structural units for preparing polyaddition or polycondensation polymers or for treatment of seed according to application PCT/EP2008/060673, which was yet to be published at the priority date of the present application.

Further embodiments of the present invention can be taken from the claims, the description and the examples. It will be appreciated that the features of the inventive subject matter which have been mentioned above and those which are still to be explained below can be used not only in the combination specified in each case but also in other combinations, without leaving the scope of the invention.

Polyetherols are typically prepared from the reaction of water, alcohols or amines by ring-opening polymerization with alkylene oxides, for example with ethylene oxide, propylene oxide or butylene oxide or mixtures thereof. Polyetherols of industrial significance are those based on water, glycols, glycerol, trimethylpropane, pentaerythritol or sugars as the starter molecule, which react with ethylene oxide, propylene oxide or ethylene oxide/propylene oxide mixtures to give linear diols or polyols with a star-shaped structure. Such processes are explained, for example, in Becker/Braun, Kunststoff-Handbuch [Polymer handbook], vol. 7, Polyurethane [Polyurethanes], Carl-Hanser-Verlag, Munich 1993, pages 58-67.

The preparation of polyethers based on glycerol is likewise described. For instance, U.S. Pat. No. 3,932,532 and DE 103 07 172 disclose the preparation of high-functionality polyethers based on glycerol with catalysis by strong alkalis to give oligomeric polyethers, and WO 2004/074346 discloses the modification thereof with monofunctional alcohols. The products thus obtained are highly colored and can be purified only with difficulty.

Moreover, DE 103 07 172 also discloses the polycondensation of glycerol in the presence of acidic catalysts, for example HCl, $H_2SO_4$, sulfonic acid or $H_3PO_4$ in the absence of water at temperatures of from 200 to 280° C. within from 5 to 15 hours. However, the reaction product thus obtained is tarlike and is unsuitable for use in industrially relevant formulations.

EP 141253, DE 4446877 and U.S. Pat. No. 5,728,796 disclose the conversion of trifunctional and higher-functionality alcohols under acidic reaction conditions in the presence of acetone or epoxy compounds. The products obtained are low molecular weight, modified alcohols.

WO 2004/074346 discloses the alkaline polycondensation of glycerol and the subsequent reaction of the resulting condensation product under acidic conditions with a fatty alcohol. This affords a polyglycerol modified with fatty alcohol. There is no further condensation of the polyglycerol to higher molecular weight reaction products under the reaction conditions specified.

High-functionality hyperbranched polyetherols of defined structure have been known only for a short time.

Hyperbranched polyglyceryl ethers are described in DE 199 47 631 and DE 102 11 664. Here, the preparation is effected by ring-opening reaction of glycidol, if appropriate in the presence of a polyfunctional starter molecule. The handling of glycidol requires a high level of safety measures; this synthesis strategy is therefore costly and suitable only to a limited degree for conversion to an industrial scale.

Hyperbranched polyetherols can also, as disclosed, for example, in WO 00/56802, be prepared by polymerizing 1-ethyl-1-hydroxymethyloxetane in a ring-opening manner with specific catalysts. The polymer skeleton consists here exclusively of trimethylpropane units. It is likewise possible to react 3,3-bis(hydroxymethyl)oxetane, according to Nishikubo et al., Polymer Journal 2004, 36 (5) 413, in a ring-opening manner to give a highly branched polyetherpolyol, consisting exclusively of pentaerythritol units. Chen et. al, J. Poly. Sci. Part A: Polym. Chem. 2002, 40, 1991 describe a synthesis in which 1-ethyl-1-hydroxymethyloxetane and 3,3-bis(hydroxymethyl)oxetane are polymerized in a ring-opening manner together. Here, a polyether formed from a mixture of trimethylpropane and pentaerythritol units is obtained.

The ring-opening polymerization of oxetanes according to aforementioned syntheses is very selective and is essentially free of side reactions; the polymers therefore feature a high purity. A disadvantage of these methods is that the preparation of the oxetanes as the starting material for the polymerization is costly and inconvenient, and the polymer synthesis requires specific reaction conditions and catalysts, which makes the preparation of the highly branched polyetherols on the industrial scale relatively unattractive from a commercial point of view.

Moreover, the very pure, structurally homogeneous polymers obtained by ring-opening polymerization also have performance disadvantages; for example, they dissolve only in selected solvents, which restricts wide use of these polyetherols. For this reason, there have been efforts to remove these disadvantages. For example, WO 03/062306 discloses that these highly branched polyetherols are utilized as core molecules for the reaction with alkylene oxides, in order to positively influence the property profile via the introduction of linear alkylene oxide chains.

It was therefore an object of the present invention to provide, by means of a technically simple and inexpensive process, industrially usable, high-functionality polyetherpolyols, especially those high-functionality polyetherols whose structures can be matched readily to the requirements of the application.

Moreover, it was an object to provide high-functionality polyetherpolyols which, on the basis of their defined structure, combine advantageous properties such as high functionality, high reactivity, low viscosity and good solubility.

Moreover, it was an object of the present invention to provide a process for preparing these high-functionality polyetherols.

The object is achieved by a process in which at least one trifunctional or higher-functionality alcohol and if appropriate further di- and/or monofunctional alcohols and/or modifying reagents are reacted with the aid of acidic catalysts, but glycerol is not used as a trifunctional alcohol.

In the context of this invention, a high-functionality polyetherol should be understood to mean a product which, as well as the ether groups which form the polymer skeleton, has at least three, preferably at least six and more preferably at least ten OH groups in pendant or terminal positions. The polymer skeleton may be linear or branched. There are in principle no upper limits to the number of terminal or pendant functional groups, but products with a very high number of functional groups may have undesired properties, for example high viscosity or poor solubility. The high-functionality polyetherols of the present invention have usually not more than 500 terminal or pendant functional groups, preferably not more than 100 terminal or pendant functional OH groups. The inventive high-functionality polyetherol is preferably the condensation product of an average of at least 3, more preferably at least 4, further preferably at least 5 and especially at least 6 difunctional, trifunctional or higher-functionality alcohols. It is further preferred that the condensation product is that formed from an average of at least 3, more preferably at least 4, especially at least 5 and particularly at least 6 trifunctional or higher-functionality alcohols.

In a preferred embodiment, the high-functionality polyethers are hyperbranched polyetherols. In the context of this invention, hyperbranched polyetherpolyols are understood to mean uncrosslinked polymer molecules with hydroxyl and ether groups which are both structurally and molecularly inhomogeneous. On the one hand, they may have a structure analogous to dendrimers proceeding from a central molecule, but with inhomogeneous chain length of the branches. On the other hand, they may also have linear regions with functional side groups. For a definition of dendrimeric and hyperbranched polymers, see also P. J. Flory, J. Am. Chem. Soc. 1952, 74, 2718 and H. Frey et al., Chem. Eur. J. 2000, 6, No. 14, 2499.

In the context of the present invention, "hyperbranched" is understood to mean that the degree of branching (DB), i.e. the mean number of dendritic bonds plus the mean number of end groups per molecule, divided by the sum of the mean number of dendritic, linear and terminal bonds, multiplied by 100, is from 10 to 99.9%, preferably from 20 to 99% and more preferably 20-95%. In the context of the present invention, "dendrimeric" is understood to mean that the degree of branching is 99.9-100%. For a definition of the degree of branching see H. Frey et al., Acta Polym. 1997, 48, 30.

The trifunctional and higher-functionality alcohols used may, for example be triols such as trimethylolmethane, trimethylolethane, trimethylolpropane (TMP), 1,2,4-butanetriol, tris(hydroxymethyl)isocyanurate, tris(hydroxyethyl)isocyanurate (THEIC). It is likewise possible to use tetrols such as bistrimethylolpropane (di-TMP) or pentaerythritol. In addition, it is possible to use higher-functionality polyols such as bispentaerythritol (di-penta) or inositols. In addition, it is also possible to use alkoxylation products of the aforementioned alcohols and of glycerol, preferably with 1-40 alkylene oxide units per molecule. Particular preference is given to using, as the trifunctional and higher-functionality alcohols, aliphatic alcohols and especially those with primary hydroxyl groups, such as trimethylolmethane, trimethylolethane, trimethylolpropane, di-TMP, pentaerythritol, di-penta and alkoxylates thereof having 1-30 ethylene oxide units per molecule, and also glyceryl ethoxylates having 1-30 ethylene oxide units per molecule. Very particular preference is given to using trimethylolpropane, pentaerythritol and ethoxylates thereof having an average of 1-20 ethylene oxide units per molecule, and glyceryl ethoxylates having 1-20 ethylene oxide units per molecule. It is likewise possible to use the alcohols mentioned in a mixture.

Less suitable as trifunctional and higher-functionality alcohols are compounds which bear OH groups on two immediately adjacent carbon atoms. Under inventive conditions, these compounds tend to elimination reactions which may be preferred over the etherification reaction. Under inventive etherification conditions, the unsaturated compounds which form by-products which lead to the reaction product being unusable in industrially relevant formulations. More particularly, such side reactions occur in the case of glycerol.

The trifunctional and higher-functionality alcohols can also be used in a mixture with difunctional alcohols. Examples of suitable compounds with two OH groups comprise ethylene glycol, diethylene glycol, triethylene glycol, 1,2- and 1,3-propanediol, dipropylene glycol, tripropylene glycol, neopentyl glycol, 1,2-, 1,3- and 1,4-butanediol, 1,2-, 1,3- and 1,5-pentanediol, hexanediol, dodecanediol, cyclopentanediol, cyclohexanediol, cyclohexanedimethanol, bis(4-hydroxycyclohexyl)methane, bis(4-hydroxycyclohexyl)ethane, 2,2-bis(4-hydroxycyclohexyl)propane, difunctional polyetherpolyols based on ethylene oxide, propylene oxide, butylene oxide or mixtures thereof, or polytetrahydrofuran. It will be appreciated that it is also possible to use the difunctional alcohols in mixtures.

The diols serve for fine adjustment of the properties of the polyetherpolyol. If difunctional alcohols are used, the ratio of difunctional alcohols to the trifunctional and higher-functionality alcohols is fixed by the person skilled in the art according to the desired properties of the polyether. In general, the amount of the difunctional alcohol(s) is from 0 to 99 mol %, preferably 0-80 mol %, more preferably 0-75 mol % and most preferably 0-50 mol % based on the total amount of all alcohols. By virtue of addition of trifunctional and higher-functionality alcohols and diols varying in the course of the reaction, it is also possible to obtain block copolyethers, for example diol-terminated polyethers.

According to the invention, it is also possible to precondense difunctional alcohols to OH-terminated oligomers and then to add the trifunctional or higher-functionality alcohol. In this way, it is likewise possible to obtain hyperbranched polymers with linear block structures.

Moreover, it is also possible to add monools to control the OH functionality during or after the conversion of the trifunctional and higher-functionality alcohols. Such monools may, for example, be linear or branched-chain, aliphatic or aromatic monools. They preferably have more than 3 and more preferably more than 6 carbon atoms. Also suitable as monools are monofunctional polyetherols. Preferably not more than 50 mol % of monool, based on the total amount of the trifunctional and higher-functionality alcohol, is added.

To accelerate the reaction, acidic catalysts or catalyst mixtures are added. Suitable catalysts are, for example, acids with a $pK_a$ of less than 2.2; particular preference is given to strong acids.

Examples of acids with a $pK_a$ of less than 2.2 are, for example, phosphoric acid ($H_3PO_4$), phosphorous acid ($H_3PO_3$), pyrophosphoric acid ($H_4P_2O_7$), polyphosphoric acid, hydrogensulfate ($HSO_4^-$), sulfuric acid ($H_2SO_4$), perchloric acid, hydrochloric acid, hydrobromic acid, chlorosulfonic acid, methanesulfonic acid, trichloromethanesulfonic acid, trifluoromethanesulfonic acid, benzenesulfonic acid or p-toluenesulfonic acid.

Further examples of inventive acidic catalysts are acidic ion exchangers or ion exchange resins. "Ion exchangers" is the collective term for solid substances or liquids which are able to absorb positively or negatively charged ions from an electrolyte solution while releasing equivalent amounts of other ions. Preference is given to using solid grains and particles whose matrix has been obtained by condensation (phenol-formaldehyde) or by polymerization (copolymers of styrene and divinylbenzene, and methacrylates and divinylbenzene).

The acidic ion exchangers used in accordance with the invention bear, for example, sulfonic acid groups, carboxylic acid groups or phosphonic acid groups. It is also possible to use ion exchangers which possess a hydrophilic cellulose structure or consist of crosslinked dextran or agarose, and bear acidic functional groups, for example carboxymethyl or sulfoethyl groups. It is also possible to use inorganic ion exchangers, such as zeolites, montmorillonites, palygorskites, bentonites and other aluminum silicates, zirconium phosphate, titanium tungstate and nickel hexacyanoferrate (II). For ion exchangers, see also RÖMPP, Chemisches Lexikon [Chemical Lexicon], Online Version 3.0, or "Ion Exchangers" by F. De Dardel and T. V. Arden, published in Ullmann's Encyclopedia of Industrial Chemistry, Electronic Release 2007. Acidic ion exchangers are obtainable, for example, in solid or dissolved form under the product names Amberlite™, Ambersept™ or Amberjet™ from Rohm and Haas.

Particular preference is given, as inventive catalysts, to phosphoric acid, polyphosphoric acid, chlorosulfonic acid, methanesulfonic acid, trichloromethanesulfonic acid, trifluoromethanesulfonic acid, benzenesulfonic acid, p-toluenesulfonic acid or acidic ion exchangers.

Very particular preference is given to methanesulfonic acid, trifluoromethanesulfonic acid, p-toluenesulfonic acid or acidic ion exchangers.

The acid is added as a catalyst generally in an amount of from 50 ppm to 10% by weight, preferably from 100 ppm to 5% by weight and more preferably from 1000 ppm to 3% by weight, based on the amount of the alcohol or alcohol mixture used.

When an acidic ion exchanger is used as a catalyst, an amount of from 1000 ppm to 30% by weight, preferably of 1-25% by weight, more preferably 1-20% by weight, based on the amount of the alcohol or alcohol mixture used, is typically added. It will be appreciated that the catalysts can also be used in a mixture.

Moreover, it is possible both by addition of the suitable catalyst and by selection of a suitable temperature to control the polycondensation reaction. In addition, it is possible via the composition of the starting components and via the residence time to establish the mean molecular weight of the polymer and its structure.

The reaction is effected typically at a temperature of from 0 to 300° C., preferably from 0 to 250° C., more preferably from 60 to 250° C. and most preferably from 80 to 250° C., in bulk or in solution. In general, it is possible to use all solvents which are inert toward the particular reactants. When solvents are used, preference is given to using organic solvents, for example decane, dodecane, benzene, toluene, chlorobenzene, xylene, dimethylformamide, dimethylacetamide or solvent naphtha.

In a particularly preferred embodiment, the condensation reaction is carried out in bulk, i.e. without addition of solvent. The water released in the reaction can be removed from the reaction equilibrium to accelerate the reaction, for example by distillation, if appropriate under reduced pressure.

The inventive high-functionality polyetherpolyols are prepared usually within a pressure range of from 0.1 mbar to 20 bar, preferably from 1 mbar to 5 bar, in reactors which are operated in batchwise operation, semicontinuously or continuously.

Preference is given to performing the reaction in a so-called "one-pot method", in which the monomer is initially charged in its entirety and the reaction is carried out in a backmixed reactor. However, reactions are also conceivable in a multistage reactor system, for example a stirred tank battery or a tubular reactor. In a preferred alternative embodiment of the present invention, the reaction can be carried out in a kneader, extruder, intensive mixer or paddle dryer.

The reaction can, if appropriate, also be carried out with the aid of ultrasound or microwave radiation.

There are various ways of stopping the intermolecular polycondensation reaction. For example, the temperature can be lowered to a range in which the reaction stops and the condensation product is storage-stable.

In addition, the catalyst can be deactivated, for example by adding a basic component such as a Lewis base or an organic or inorganic base.

In a further preferred embodiment, the inventive polyetherols may, in addition to the OH groups already obtained through the reaction, comprise further functional groups. These comprise mercapto groups, primary, secondary or tertiary amino groups, ester groups, carboxylic acid groups or derivatives thereof, sulfonic acid groups or derivatives thereof, phosphonic acid groups or derivatives thereof, silane groups, siloxane groups, aryl radicals or short- or long-chain alkyl radicals. For this purpose, modifying reagents are used. These are compounds which have such a further functional group and a group reactive toward alcohol. Such groups reactive toward alcohol may, for example be isocyanate groups, acid groups, acid derivatives, epoxy groups or alcohol groups. In this case, the modifying reagents may be added to the high-functionality polyether before or during the conversion of the trifunctional or higher-functionality alcohols.

When the trifunctional or higher-functionality alcohol or the alcohol mixture is converted in one step in the presence of modifying reagents, a polyether polymer is obtained with randomly distributed functionalities other than the hydroxyl groups. Such a functionalization can be achieved, for example, by adding compounds which bear mercapto groups, primary, secondary or tertiary amino groups, ester groups, carboxylic acid groups or derivatives thereof, sulfonic acid groups or derivatives thereof, phosphonic acid groups or derivatives thereof, silane groups, siloxane groups, aryl radicals or short- or long-chain alkyl radicals.

For the modification with mercapto groups, it is possible, for example, to use mercaptoethanol. Tertiary amino groups can be obtained, for example, by incorporating alcohols containing amino groups, such as triethanolamine, tripropanolamine, triisopropanolamine, N-methyldiethanolamine, N-methyldipropanolamine or N,N-dimethylethanolamine. Addition of dicarboxylic acids, tricarboxylic acids, dicarboxylic esters, for example adipic acid, dimethyl terephthalate or tricarboxylic esters, allows ester groups to be obtained. In addition, ester groups can be obtained by reacting the OH groups with lactones, especially with caprolactone. By reaction with long-chain alkanols or alkanediols, it is possible to introduce long-chain alkyl radicals. The reaction with alkyl or aryl isocyanates, diisocyanates or oligoisocyanates generates corresponding polyethers having urethane groups.

A subsequent functionalization can be obtained by reacting the resulting high-functionality, highly branched or hyperbranched polyetherpolyol in an additional process step with a suitable functionalizing reagent which can react with the OH groups of the polyether.

The inventive high-functionality polyether can, for example, be modified by adding modifying reagents which comprise acid, acid halide or isocyanate groups. In addition, it is possible, for example, to obtain polyethers comprising acid groups by reacting the OH groups with compounds comprising anhydride groups. Ester groups can be introduced subsequently, for example, by reaction with caprolactone. In this case, the length of the ester chains can be controlled by the amount of caprolactone used.

In addition, the inventive high-functionality polyetherols can also be converted by reaction with alkylene oxides, for example ethylene oxide, propylene oxide, butylene oxide or mixtures thereof, as modifying reagents to high-functionality polyetherpolyols comprising linear polyether chains with adjustable polarity.

Amphiphilic molecules obtained by modification can be used as phase transfer reagents or as micro- or nanocontainers, for example for biologically active or active medical ingredients. For example, it is possible to modify hydrophobic polyethers with hydrophilic groups, such that they are soluble in an aqueous medium. These can then be laden with hydrophobic substances, for example active medical ingredients, which can thus be transported via the bloodstream to the site of action thereof. On the other hand, it is also possible to hydrophobically modify hydrophilic polyethers and then to load them with hydrophilic molecules.

The specific selection of the reaction conditions, such as pressure and temperature, and the concentration of the alcohols and if appropriate of the modifying reagents depends on the reactivity of the alcohols and of the modifying reagents. In principle, a lower temperature, a higher reactivity of the modifying reagents and a higher concentration of the modifying reagents leads, if anything, to low molecular weight modified alcohols, whereas a higher temperature, a lower concentration of modifying reagents and a lower reactivity of the modifying reagents leads, if anything, to condensation products which have a plurality of difunctional, trifunctional and higher-functionality alcohols per molecule. The reaction conditions in the process according to the invention are preferably selected such that the polyetherpolyols obtained have condensation products formed from an average of at least 3, more preferably at least 4, further preferably at least 5 and especially at least 6 difunctional, trifunctional or higher-functionality alcohols. Further preferably, the reaction conditions are selected such that the high-functionality polyetherpolyols obtained are condensation products formed from an average of at least 3, more preferably at least 4, further preferably at least 5 and especially at least 6 trifunctional or higher-functionality alcohols. The number of difunctional, trifunctional or higher-functionality alcohols in the condensation product can be determined, for example, from the number-average molecular weight $M_n$ determined by GPC.

The aforementioned adjustment of the reaction conditions and if appropriate the selection of the suitable solvent allow the inventive products to be processed further without further purification after the preparation.

In a further preferred embodiment, the reaction product is purified by stripping, i.e. by removing low molecular weight volatile compounds. For this purpose, the catalyst can be deactivated after the desired conversion has been attained. Subsequently, the low molecular weight volatile constituents, for example solvents, starting monomers, volatile cleavage products, volatile oligomeric or cyclic compounds or water are removed by distillation, if appropriate with introduction of a gas, preferably nitrogen, carbon dioxide or air, if appropriate under reduced pressure. In a preferred embodiment, the product is freed of volatile constituents in a thin-film evaporator.

Owing to the properties of the starting monomers, it is possible that the reaction can result in condensation products with different structures, which have branches and cyclic units but no crosslinks. The number of reactive groups arises from the properties of the monomers used and the degree of polycondensation, which, according to the invention, should be selected such that the gel point is not attained.

The inventive polyetherpolyols based on trimethylolpropane have lower masses, lower degradation temperatures and lower glass transition temperatures than products which are obtained by ring-opening polymerization.

In addition, inventive products which are formed from TMP units may have molecular moieties in which the OH groups of a terminal TMP unit are present in the form of the formaldehyde acetal. The content of acetal groups can be established with the aid of the reaction conditions for the inventive polyetherpolyols.

The high-functionality highly branched polyethers formed by the process according to the invention dissolve readily in various solvents, for example in water, alcohols such as methanol, ethanol, butanol, alcohol/water mixtures, acetone, 2-butanone, ethyl acetate, butyl acetate, methoxypropyl acetate, methoxyethyl acetate, tetrahydrofuran, dimethylformamide, dimethylacetamide, N-methylpyrrolidone, ethylene carbonate or propylene carbonate.

A great advantage of the process according to the invention lies in its economic viability. Both the reaction to give the polycondensation product and the reaction of the condensation products to give polyethers with other functional groups or elements can be effected in one reaction apparatus, which is technically and economically advantageous.

The inventive high-functionality highly branched or high-functionality hyperbranched polyetherols can be used in an industrially advantageous manner, inter alia, as adhesion promoters, thixotropic agents, rheology modifiers of polymers, phase transfer reagents, micro- or nanocontainers for biologically active compounds, for example for active medical ingredients, biocides, herbicides or fungicides, as pigment dispersants, an additive in printing inks or as structural units for preparing polyaddition or polycondensation polymers, for example in paints, coatings, adhesives, sealants, cast elastomers or foams.

In addition, the inventive polyethers can be used in an industrially advantageous manner for treatment of seed according to application PCT/EP2008/060673, which was yet to be published at the priority date of the present application.

They are suitable especially for producing printing inks, such as flexographic printing inks, gravure printing inks, offset printing inks or screenprinting inks, and for producing print varnishes. More particularly, the inventive polyethers are suitable for producing mobile printing inks, such as flexographic printing or gravure printing inks for packaging printing. They can be used for different purposes in printing inks, but especially as binders, if appropriate also in a mixture with other binders.

For this purpose, the inventive polyethers are formulated with suitable solvents, colorants, optionally further binders and additives typical of printing inks. For further details regarding the formulation and production of printing inks with hyperbranched polymers, reference is made explicitly to WO 02/36695 and WO 02/26697, especially to the remarks in WO 02/36695, page 10 line 19 to page 15 line 14, and WO 02/36697, page 7 line 14 to page 10 line 18, and the examples adduced in said documents.

Printing inks which comprise the inventive polyethers have a particularly good adhesion which has been unknown to date on the substrates, especially on metal foils and/or polymer films.

The printing inks are therefore also very particularly suitable for producing laminates composed of two or more polymer films and/or metal foils, in which one film is printed with one or more layers of a printing ink and a second film is laminated onto the printed layer. Such composites are used, for example, for producing packaging.

The present invention will be illustrated in detail with reference to the examples which follow.

EXAMPLE 1

Preparation of an Inventive Polyetherpolyol Based on Trimethylolpropane

The polycondensation was carried out in a 2 l glass flask equipped with stirrer and distillation apparatus. The mixture of 990 g of trimethylolpropane and 10 g of p-toluenesulfonic acid (1% by weight) was heated to 200° C. by means of an oil bath and stirred under these conditions at standard pressure for 6 h, in the course of which water and volatile by-products were distilled off. Thereafter, the reaction mixture was allowed to cool and admixed with 2 l of methanol. To neutralize the acidic catalyst, the solution was admixed with 4.5 g of zinc oxide and stirred overnight, insoluble constituents were filtered off through Celite and the reaction mixture was then concentrated to dryness on a rotary evaporator at 40° C. and under a reduced pressure of down to 22 mbar. The crude product was then dissolved in 1.5 l of isohexane, insoluble constituents were filtered off through Celite and the reaction mixture was then concentrated to dryness again on a rotary evaporator at 40° C. and under a reduced pressure of down to 22 mbar. The crude product was subsequently melted at 100° C. and, to remove volatile constituents and unreacted TMP, purified by means of a thin-film evaporator at an oil temperature of 130° C. and a pressure of $1*10^{-1}$ mbar. 420 g (43% by weight) of polyetherpolyol were obtained.

The product had the following characteristic data:
$T_g$ (10° C./min): −32° C.
$M_w/M_n$ (GPC; DMF): 710/540 [g/mol]
Degree of branching: 60%
OHN: 304 mg KOH/g

EXAMPLE 2

Preparation of an Inventive Polyetherpolyol Based on Trimethylolpropane

The polycondensation was carried out in a 2 l glass flask equipped with stirrer, a Vigreux column with descending condenser and vacuum attachment. The mixture of 990 g of trimethylolpropane and 10 g of p-toluenesulfonic acid (1% by weight) was evacuated and heated to 170° C. at a pressure of 20 mbar by means of an oil bath. On attainment of the reaction temperature, the mixture was stirred at this temperature for 18 h and volatile components were distilled off. The reaction mixture was then allowed to cool under reduced pressure and admixed with 2 l of methanol. To neutralize the acidic catalyst, 4.5 g of zinc oxide were now added, and the reaction mixture was stirred overnight, insoluble constituents were filtered off through Celite and the reaction mixture was then concentrated to dryness on a rotary evaporator at 40° C. and under a reduced pressure of down to 22 mbar. To remove by-products and unreacted TMP, the crude product was subsequently purified by vacuum distillation (oil bath temperature 210° C., $5.4*10^{-2}$ mbar). 620 g (62% by weight) of polyetherpolyol were obtained as the bottom product.

The product had the following characteristic data:
$T_g$ (10° C./min): −9° C.
$M_w/M_n$ (GPC; DMF): 1510/840 [g/mol]
Degree of branching: 68%
OHN: 421 mg KOH/g

EXAMPLE 3

Preparation of an Inventive Polyetherpolyol Based on Trimethylolpropane

The polycondensation was carried out in a 1 l glass flask equipped with stirrer, a Vigreux column with descending condenser and vacuum attachment. The mixture of 450 g of trimethylolpropane and 50 g of Amberlite™ IR 120 ion exchanger from Rohm & Haas (10% by weight, solid material, dried from aqueous solution) was evacuated and heated to 200° C. by means of an oil bath at a pressure of 12 mbar. On attainment of the reaction temperature, the mixture was stirred at this temperature for 24 h and volatile components were distilled off. The reaction mixture was then allowed to cool under reduced pressure and 1 l of methanol was added. After the ion exchanger had been filtered off, the reaction mixture was concentrated to dryness on a rotary evaporator at 40° C. and under a reduced pressure of down to 22 mbar. To remove by-products and unreacted TMP, the crude product was subsequently purified by distilling twice on a thin-film evaporator at an oil temperature of 195° C. and a pressure of $1$-$5*10^{-2}$ mbar. 183 g (41% by weight) of polyetherpolyol were obtained.

The product had the following characteristic data:
$T_g$ (10° C./min): −13° C.
$M_w/M_n$ (GPC; DMF): 1100/900 [g/mol]
OHN: 617 mg KOH/g
Degree of branching: 31%

EXAMPLE 4

Preparation of an Inventive Polyetherpolyol Based on Trimethylolpropane (TMP) and Triethylene Glycol (TEG)

The polymerization was carried out in a 250 ml glass flask equipped with a stirrer, reflux condenser and a distillation apparatus with vacuum attachment. The mixture of 25 g of trimethylolpropane (0.19 mol), 28 g of triethylene glycol (0.19 mol) and 1.1 g of Amberlite™ IR 120 ion exchanger (2% by weight, solid material, dried from aqueous solution) was evacuated and heated slowly to 160° C. by means of an oil bath at a pressure of 12 mbar. On attainment of the reaction temperature, the reaction mixture was stirred for 24 h and volatile constituents were removed by means of distillation. Thereafter, the reaction mixture was allowed to cool under reduced pressure. The crude product was taken up in methanol, the ion exchanger was filtered off and the reaction solution was then concentrated to dryness on a rotary evaporator at 40° C. and under a reduced pressure of down to 22 mbar. To remove the volatile by-products and unreacted feedstocks, the crude product was then purified twice by means of a thin-film evaporator at an oil temperature of 195° C. and a pressure of $1$-$5*10^{-2}$ mbar. 22.5 g (43% by weight) of the polyetherol were obtained.

The reaction product had the following characteristic data:
$T_g$ (10° C./min): −60° C.
$M_w/M_n$ (GPC; DMF): 1110/760 [g/mol]

EXAMPLE 5

Preparation of an Inventive Polyetherpolyol Based on Trimethylolpropane and Pentaerythritol (PE)

The polymerization was carried out in a 1 l glass flask equipped with stirrer and a Vigreux column with distillation apparatus and vacuum attachment. The mixture of 350 g of trimethylolpropane (2.61 mol), 100 g of pentaerythritol (0.74 mol) and 50 g of Amberlite™ IR 120 ion exchanger (10% by weight, solid material, dried from aqueous solution) was evacuated and heated to 200° C. by means of an oil bath at a pressure of 12 mbar. On attainment of the reaction temperature, the mixture was stirred for 24 h. Thereafter, the reaction mixture was allowed to cool under reduced pressure. The crude product was taken up in methanol, the ion exchanger and unreacted pentaerythritol were filtered off, and the reaction solution was concentrated to dryness on a rotary evaporator at 40° C. and under a reduced pressure of down to 22 mbar. To remove volatile by-products and unreacted feedstocks, the crude product was subsequently purified twice with a thin-film evaporator at an oil temperature of 195° C. and a pressure of $1-5*10^{-2}$ mbar. 236 g (58% by weight) of polyetherol were obtained.

The product had the following characteristic data:
$T_g$ (10° C./min): −9° C.
$M_w/M_n$ (GPC; DMF) 670/560 [g/mol]

EXAMPLE 6

Preparation of an Inventive Polyetherpolyol Based on Pentaerythritol and Triethylene Glycol The polymerization was carried out in a 1 l glass flask equipped with a stirrer, reflux condenser and a distillation apparatus with vacuum attachment. The mixture of 225.9 g of pentaerythritol (1.66 mol), 249.1 g of triethylene glycol (1.66 mol) and 4.8 g of p-toluenesulfonic acid monohydrate (1% by weight) was evacuated and heated slowly to 200° C. by means of an oil bath at a pressure of 12 mbar. On attainment of the reaction temperature, the reaction mixture was stirred for 15 h. Thereafter, the reaction mixture was allowed to cool under reduced pressure. The crude product was taken up in 1 l of methanol and unconverted pentaerythritol was filtered off. For neutralization, 10 g of basic aluminum oxide (MP ALUMINA B ACTIVITY SUPER I; 04571, MP Ecochrom) were added to the reaction solution, and the mixture was stirred for 2 h and incubated at −20° C. overnight. After thawing, insoluble constituents were filtered off through Celite and the reaction mixture was then concentrated to dryness on a rotary evaporator at 40° C. and under a reduced pressure of down to 22 mbar.

To remove unreacted ethylene glycol, the crude product was purified twice by means of a thin-film evaporator at an oil temperature of 195° C. and a pressure of $1-5*10^{-2}$ mbar. 248 g (52% by weight) of polyetherpolyol were obtained.

The product had the following characteristic data:
$T_g$ (10° C./min): −36° C.
$M_w/M_n$ (GPC; DMF) 4820/1540 [g/mol]
OHN: 539 mg KOH/g

EXAMPLE 7

Preparation of an Inventive Polyetherpolyol Based on Pentaerythritol

The polymerization was in a 250 ml glass flask equipped with a stirrer, a Vigreux column with descending condenser and vacuum attachment reflux condenser. 49.75 g of pentaerythritol (0.37 mol) and 0.25 g of p-toluenesulfonic acid monohydrate (1% by weight) were evacuated and heated to 210° C. by means of an oil bath at a pressure of 12 mbar. On attainment of the reaction temperature, the reaction mixture was stirred for 30 min. Thereafter, the reaction mixture was allowed to cool under reduced pressure. The crude product was taken up in water, refluxed for 1 h and hot-filtered. The residue was dried in a vacuum drying cabinet at 80° C. 17.91 g (36% by weight) of polyetherpolyol were obtained. For NMR and GPC measurements, the product was acetylated with acetic anhydride.

The product had the following characteristic data:
$T_g$ (10° C./min): 32° C.
$M_w/M_n$ (GPC; CHCl$_3$): 3310/1600 [g/mol]
Degree of branching: 56.5%

EXAMPLE 8

Preparation of an Inventive Polyetherpolyol Based on Trimethylolpropane, Randomly Etherified with 3 mol of Ethylene Oxide The polycondensation was carried out in a 250 ml glass flask equipped with a stirrer, a Vigreux column with descending condenser and vacuum attachment. The mixture of 45 g of trimethylolpropane, randomly etherified with 3 mol of ethylene oxide, and 5 g of Amberlite™ IR 120 ion exchanger from Rohm & Haas (10% by weight, solid material, dried from aqueous solution) was evacuated and heated to 200° C. by means of an oil bath at a pressure of 12 mbar. On attainment of the reaction temperature, the mixture was stirred at this temperature for 24 h and volatile components were distilled off. Thereafter, the reaction mixture was allowed to cool under reduced pressure and 200 ml of methanol were added. After the ion exchanger had been filtered off, the reaction mixture was concentrated to dryness on a rotary evaporator at 40° C. and a reduced pressure of down to 22 mbar. The crude product was subsequently purified by vacuum distillation (oil bath temperature 210° C., $5.4*10^{-2}$ mbar). 28 g (62% by weight) of polyetherpolyol were obtained as the bottom product.

The product had the following characteristic data:
$T_g$ (10° C./min): −62° C.
$M_w/M_n$ (GPO; DMF): 1350/1150 [g/mol]

EXAMPLE 9

Preparation of an Inventive Derivative of a Polyetherpolyol Based on Trimethylolpropane, Acetylated with Acetic Anhydride 0.50 g of the polymer from example 3 and 5 mg of p-toluenesulfonic acid monohydrate (1% by weight) were refluxed in 10 ml of acetic anhydride for 4 h. Thereafter, the solution was concentrated to dryness on a rotary evaporator at 40° C. and under a reduced pressure of down to 22 mbar and taken up in 30 ml of chloroform, and the solution was extracted by shaking three times with 20 ml of water in a separating funnel. The organic phase was dried over MgSO$_4$ and filtered, and the filtrate was concentrated to dryness on a rotary evaporator at 40° C. and under a reduced pressure of down to 22 mbar and dried at 80° C. in a vacuum drying cabinet overnight. 0.73 g of derivatized polyetherpolyol was obtained.

The product had the following characteristic data:
$M_w/M_n$ (GPC; CHCl$_3$): 1000/740 [g/mol]

EXAMPLE 10

Preparation of an Inventive Derivate of a Polyetherpolyol Based on Pentaerythritol and Triethylene Glycol, Acetylated with Acetic Anhydride 0.50 g of the polymer from example 6 was refluxed in 10 ml of acetic anhydride for 4 h. Thereafter, the solution was concentrated to dryness on a rotary evaporator at 40° C. and under a reduced pressure of down to 22 mbar and dried at 80° C. in a vacuum drying cabinet overnight. 0.68 g of derivatized polyetherpolyol was obtained.

The product had the following characteristic data:
$T_g$ (10° C./min): −54° C.
$M_w/M_n$ (GPC; CHCl$_3$): 4820/1540 [g/mol]

EXAMPLE 11

Preparation of an Inventive Derivative of a Polyetherpolyol Based on Trimethylolpropane and Methyl Stearate 163 g of the polymer from example 3 were stirred with 344.5 g of methyl stearate and 5.1 g of dibutyltin dilaurate (1% by weight) at 170° C. for 72 h. MeOH which formed was removed by distillation. The crude product was subsequently purified by vacuum distillation (oil bath temperature 210° C., 5.4*10$^{-2}$ mbar). 351.2 g of derivatized polyetherpolyol were obtained as the bottom product.

The product had the following characteristic data:
$T_m$ (10° C./min): 33° C.
$M_w/M_n$ (GPC; CHCl$_3$): 1520/1240 [g/mol]
Degree of derivatization: 44%

EXAMPLE 12

Preparation of an Inventive Derivative of a Polyetherpolyol Based on Trimethylolpropane and Methyl Stearate 200 g of the polymer from example 3 were stirred with 668.7 g of methyl stearate and 8.8 g of dibutyltin dilaurate (1% by weight) at 170° C. for 72 h. MeOH which formed was removed by distillation. The crude product was subsequently purified by vacuum distillation (oil bath temperature 210° C., 5.4*10$^{-2}$ mbar). 772.0 g of derivatized polyetherpolyol were obtained as the bottom product.

The product had the following characteristic data:
$T_m$ (10° C./min): 38° C.
$M_w/M_n$ (GPC; CHCl$_3$): 2510/2160 [g/mol]
Degree of derivatization: 100%

EXAMPLE 13

Preparation of an Inventive Derivative of a Polyetherpolyol Based on Pentaerythritol and Triethylene Glycol and Methyl Stearate 30 g of the polymer from example 6 were stirred with 35 g of methyl stearate and 0.66 g of dibutyltin dilaurate (1% by weight) at 170° C. for 72 h. MeOH which formed was removed by distillation. The crude product was subsequently purified by vacuum distillation (oil bath temperature 210° C., 5.4*10$^{-2}$ mbar). 64 g of derivatized polyetherpolyol were obtained as the bottom product.

The product had the following characteristic data:
$T_m$ (10° C./min): 44° C.
$M_w/M_n$ (GPC; CHCl$_3$): 4740/2420 [g/mol]
Degree of derivatization: 45%

EXAMPLE 14

Preparation of an Inventive Derivative of a Polyetherpolyol Based on Pentaerythritol and Triethylene Glycol and Methyl Stearate 20 g of the polymer from example 6 were stirred with 67 g of methyl stearate and 0.87 g of dibutyltin dilaurate (1% by weight) at 170° C. for 72 h. MeOH which formed was removed by distillation. The crude product was subsequently purified by vacuum distillation (oil bath temperature 210° C., 5.4*10$^{-2}$ mbar). 6.5 g of derivatized polyetherpolyol were obtained as the bottom product.

The product had the following characteristic data:
$T_m$ (10° C./min): 42° C.
$M_w/M_n$ (GPC; CHCl$_3$): 3370/3028 [g/mol]
Degree of derivatization: 80%

EXAMPLE 15

Preparation of an Inventive Derivative of a Polyetherpolyol Based on Pentaerythritol and Triethylene Glycol with 2,2-Dimethoxypropane Acetalization 2 g of a polymer from example 6 were stirred with 4.75 ml of 2,2-dimethoxypropane (38.4 mmol, approx. 2 eq. per OH group) and 0.14 ml of methanesulfonic acid (1.92 mmol, approx. 10 mol % of the OH groups) at room temperature for 3 d. The crude product was subsequently admixed with 0.75 ml of pyridine and concentrated to dryness on a rotary evaporator at 40° C. and under a reduced pressure of down to 22 mbar. The residue was taken up in 20 ml of THF and filtered, and the filtrate was concentrated to dryness on a rotary evaporator at 40° C. and under a reduced pressure of down to 22 mbar. 2.1 g of derivatized polyetherpolyol were obtained.

The product had the following characteristic data:
$T_m$ (10° C./min): −48° C.
Degree of derivatization: 50%

EXAMPLE 16 (COMPARATIVE EXAMPLE)

Preparation of a Polyetherpolyol Based on Glycerol

The polycondensation was carried out in a 500 ml glass flask equipped with stirrer and distillation apparatus. The mixture of 100 g of glycerol and 1 g of p-toluenesulfonic acid (1% by weight) was heated to 200° C. by means of an oil bath and stirred at standard pressure under these conditions over 1.5 h, in the course of which water and volatile by-products (approx. 30 g) distilled off. Thereafter, the reaction mixture was allowed to cool. A black, tarlike, pungent-smelling product was obtained, which was unsuitable for use in industrially relevant formulations.

EXAMPLE 17 (COMPARATIVE EXAMPLE)

Polyetherpolyol Based on 1-ethyl-1-hydroxymethyloxetane according to Yan et al., Macromolecules 2003, 36, 9667

5.4 ml of boron trifluoride etherate (43.1 mmol) and dichloromethane (100 ml) which has been dried over CaH$_2$ and distilled under argon were initially charged and stirred at RT. 50 g of 3-ethyl-3-hydroxymethyloxetane (43.1 mmol) are slowly added dropwise within 4 h with the aid of a syringe pump of the PERFUSOR® model (flow rate: 12.5 ml/h).

The reaction mixture is stirred at RT over a period of 48 h in total. The reaction is stopped by adding 10 ml of ethanol, then the mixture is left to stir for a further 1-2 h. The solution is subsequently concentrated to dryness on a rotary evaporator at 70° C. and under a reduced pressure of down to 350 mbar, and the residue is admixed with 15-20 ml of ethanol and stirred at 60° C. until a homogeneous solution has formed. Finally, the polymer is precipitated in 200 ml of water. The product is dried under reduced pressure at 80° C. for several days. 45 g (90%) of a colorless solid are obtained.

The product had the following characteristic data:
$T_g$ (10° C./min): 24° C.
$T_m$ (10° C./min): 54° C. (only 1st heating curve)
$M_w/M_n$ (GPC; CHCl$_3$): 6240/3900 (calculated from the molar mass of the modified polyether according to example 18)
Degree of branching: 54%

EXAMPLE 18 (COMPARATIVE)

Trifluoroacetylation of poly(3-ethyl-3-hydroxymethyl-oxetane) According to Example 17

1 g of the polyetherpolyol according to example 17 was admixed with 10 ml of trifluoroacetic anhydride and the mixture was stirred under reflux at 50° C. for 4 h. Subsequently, the product was freed of low molecular weight reaction residues by concentration under reduced pressure and then dried at 60° C. under reduced pressure overnight.

The product had the following characteristic data:
$M_w/M_n$ (GPC; CHCl$_3$): 7900/4970 [g/mol]

EXAMPLE 19

Comparison of the Properties of the Inventive Polyethers with a Prior Art Polyether The inventive polyetherpolyols based on trimethylolpropane have lower molar masses, lower degradation temperatures and lower glass transition temperatures than the literature system.

In addition, the inventive products comprise TMP units which are present in the form of the formaldehyde acetal. The content of acetal groups can be adjusted with the aid of the reaction conditions for the inventive polyetherpolyols. In contrast, the literature system does not comprise any acetal functionalities.

solvents rises with the number of incorporated TMP units which are present in the form of the formaldehyde acetal.

EXAMPLE 20

Loadability of an Inventive Derivative of a Polyetherpolyol, Modified with Methyl Stearate In order to test the loadability of the inventive amphiphiles, each of the derivatized polyetherpolyols from Examples 11, 12 and 13 was dissolved in chloroform in different concentrations and blanketed with a constant amount of an aqueous solution of Congo red, an anionic chloroform-insoluble dye. After shaking and subsequent phase separation, the chloroform phase was analyzed by means of fluorescence spectroscopy. For all polyetherpolyols, a fluorescence intensity in the chloroform phase which rises with increasing polyetherol concentration was observed.

Analysis:

$^1$H and $^{13}$C NMR spectra were recorded on a Bruker® ARX300 instrument at 300/75 MHz in DMSO-d$_6$ and CDCl$_3$. The solvent signals were calibrated to 2.50 ppm for $^1$H and 39.51 ppm for $^{13}$C for DMSO-d$_6$, and to 7.26 ppm for $^1$H and 77.0 ppm for $^{13}$C for CDCl$_3$.

Degrees of branching were determined from quantitative $^{13}$C NMR spectra of the products acetylated with acetic anhydride, using inverse gated decoupling, 4000 scans, a pulse delay of 3.1 seconds and a very small amount of Cr(acac)$_3$ as a relaxation reagent. The quaternary carbon atoms were integrated in each case. The degree of branching was calculated according to literature formulae for AB$_2$ and AB$_3$ systems (H. Frey et al., Acta Polym. 1997, 48, 30). In the case of systems which comprise TEG units, the degree of branching could not be determined owing to unknown length of the internal ethylene glycol units.

Molecular weights and molecular weight distributions were determined by GPC against polystyrene standards. GPC measurements were carried out at 30° C. in chloroform or DMF with PSS-SDVB columns (5 µm particles, 10$^3$, 10$^4$, 10$^5$ and 10$^6$ Å). The polymer concentration was about 2 mg/ml.

TABLE 1

Solubility behavior of 100 mg each of the inventive polyetherpolyols based on trimethylolpropane and the literature system in 3 ml of solvent at room temperature.

| Polymer from ex. | Water | Methanol | Pyridine | Ethyl acetate | Acetone | THF | Chloroform | Toluene |
|---|---|---|---|---|---|---|---|---|
| 1 | − | + | + | + | + | + | + | + |
| 2 | − | + | + | − | + | + | + | − |
| 3 | − | + | + | − | + | + | − | − |
| 17 | − | − | + | − | − | + | − | − |

+: soluble
−: insoluble

The inventive polyetherpolyols based on trimethylolpropane have a significantly better solubility than the literature system, which is insoluble in many common solvents such as methanol and acetone. This can be attributed firstly to the presence of the formaldehyde acetals, and also to the lower molar masses of the inventive polyetherpolyols (see table 1). The solubility of the inventive polyetherpolyols in nonpolar The DSC measurement was effected with a DSC-7 differential scanning calorimeter from Perkin-Elmer. To this end, 5-7 mg of the sample were weighed into an aluminum crucible and analyzed within a temperature range of from −100 to +100° C. at a heating and cooling rate of 10 K·min$^{−1}$. $T_g$ and $T_m$ were determined from the second heating curve.

Degrees of reaction were determined from $^1$H NMR spectra after reaction with trichloroacetyl isocyanate (Moad et al. Polymer 2006, 47, 1899) or from quantitative $^{13}$C NMR spectra.

The filtration aid used was Celite® 545 from MERCK.

The hydroxyl number was determined by the following method:

1. Preparation of the acylation mixture: phthalic anhydride (257.0 g, 1.74 mol) was weighed into a 2 l brown glass bottle. 1800 ml of pyridine and 40 ml of N-methyl-imidazole were then added. This mixture was stored over a molecular sieve and prepared at least 24 h before the first use.

2. Determination of the blank value $V_{blank}$: 25 ml of acylation mixture were pipetted into a 250 ml one-neck flask and admixed with pyridine (25 ml) and dist. H$_2$O (50 ml). The mixture was stirred for 10 min and then titrated with NaOH (1N) using phenolphthalein. The blank test was titrated twice, and $V_{blank}$=50.2 ml was obtained.

3. Determination of the OH number ($V_{sample}$): 1.500 g of the hydroxyl component were weighed into a 250 ml one-neck flask. To this were pipetted 25 ml of acylation mixture. The mixture was boiled under reflux (130° C.) for 10 min. This mixture was then cooled in an ice bath for 10 min and admixed with pyridine (25 ml) and dist. H$_2$O (50 ml) and mixed thoroughly. The sample was titrated with NaOH (1N) using phenolphthalein. This procedure was repeated until the difference was less than 0.2 ml. The resulting volumes ($V_{blank}$, $V_{sample}$) were used in the following equation:

$$OHN = \frac{(V_{blank} - V_{sample})}{m_{sample}} \cdot 56.1 = \frac{mgKOH}{g \text{ sample}}$$

The fluorescence measurements were carried out on a TIDAS absorption and photoluminescence diode array spectrometer with a SPECTRALYS monochromator. For this purpose, an excitation wavelength of 360 nm was selected and the particular maximum fluorescence intensity was determined.

The invention claimed is:

1. A process for preparing a high-functionality polyetherol comprising reacting by polymerization, other than by ring-opening polymerization of an oxetane, at least one triol or polyol with optionally at least one of a diol, a monool and/or a modifying reagent, as the only reactants, with the aid of an acidic catalyst, wherein the modifying reagent is not the same as said monool, diol, triol and polyol, wherein the triol or polyol is at least one compound selected from the following groups:

(1) a group consisting of trimethylolmethane, trimethylolethane, trimethylolpropane (TMP), 1,2,4-butanetriol, tris(hydroxymethyl) isocyanurate, tris(hydroxyethyl) isocyanurate (THEIC), bistrimethylolpropane (di-TMP), pentaerythritol, bispentaerythritol (di-penta) and inositol, and (2) an alkoxylation product containing 1-40 ethylene oxide units per molecule and obtained by reacting any member of (1) with ethylene oxide, wherein the diol has two hydroxyl groups and is at least one compound selected from the following group:

ethylene glycol, diethylene glycol, triethylene glycol, 1,2- and 1,3-propanediol, dipropylene glycol, tripropylene glycol, neopentyl glycol, 1,2-, 1,3- and 1,4-butanediol, 1,2-, 1,3- and 1,5-pentanediol, hexanediol, dodecanediol, cyclopentanediol, cyclohexanediol, cyclohexanedimethanol, bis(4-hydroxycyclohexyl)methane, bis(4-hydroxycyclohexyl)ethane, 2,2-bis(4-hydroxycyclohexyl)propane, a dihydroxyl-group containing polyetherpolyol based on ethylene oxide, propylene oxide, butylene oxide or mixtures thereof, and polytetrahydrofuran terminated at each end thereof with a hydroxyl group, and wherein the modifying reagent adds randomly distributed functionalities other than the OH groups to the high-functionality polyetherol and comprises a compound bearing mercapto groups; primary, secondary or tertiary amino groups; three carboxyl groups or esters thereof; sulfonic acid groups or derivatives thereof; phosphonic acid groups or derivatives thereof, silane groups, and siloxane groups.

2. The process according to claim 1, wherein the high-functionality polyetherol is the condensation product formed from an average of at least 3 diols, triols, polyols, or mixtures thereof, with the proviso that said at least 3 diols, triols, polyols, or mixtures thereof comprises at least one triol or polyol and optionally a diol.

3. The process according to claim 2, wherein the diol is present.

4. The process according to claim 1, wherein the temperature in the reaction is between 80 and 250° C.

5. The process according to claim 1, wherein the reaction is effected without addition of a solvent.

6. The process according to claim 1, wherein the acidic catalyst is an acid with a pKa of less than 2.2.

7. The process according to claim 1, wherein the acidic catalyst is an acidic ion exchange resin with a pKa of less than 2.2.

8. The process according to claim 1, wherein no modifying reagent is reacted.

9. The process according to claim 1, wherein a modifying reagent is reacted.

10. A high-functionality polyetherol obtained by a process according to claim 1.

11. The process according to claim 1, wherein the high-functionality polyetherol is a hyperbranched polyetherol.

12. The process according to claim 1, wherein the diol is present.

13. The process according to claim 1, wherein the reactants are trimethylolpropane and triethylene glycol.

14. The process according to claim 1, wherein the reactants are trimethylolpropane and pentaerythritol.

15. The process according to claim 1, wherein the reactants are pentaerythritol and triethylene glycol.

* * * * *